(12) United States Patent
Martinez et al.

(10) Patent No.: US 6,840,711 B1
(45) Date of Patent: Jan. 11, 2005

(54) FLOOD CONTROL PANEL SYSTEM

(76) Inventors: Ross R. Martinez, 417 W. Marion St., Eatonton, GA (US) 31204; Renate H. Martinez, 417 W. Marion St., Eatonton, GA (US) 31204

( * ) Notice: Subject to any disclaimer, the term of this patent is extended or adjusted under 35 U.S.C. 154(b) by 0 days.

(21) Appl. No.: 10/402,269

(22) Filed: Mar. 31, 2003

(51) Int. Cl.$^7$ ................................................ E02B 3/10
(52) U.S. Cl. ......................... 405/107; 405/15; 405/114; 405/90
(58) Field of Search ........................... 405/90, 99, 100, 405/107, 114, 115, 15, 21, 25, 28, 31

(56) References Cited

U.S. PATENT DOCUMENTS

| | | | |
|---|---|---|---|
| 972,059 A | 10/1910 | Clarke | |
| 4,375,929 A | 3/1983 | Clark | |
| 4,498,810 A | 2/1985 | Muramatsu et al. | |
| 4,511,286 A * | 4/1985 | Hardacre | 405/115 |
| 4,692,090 A | 9/1987 | Naka | |
| 5,040,919 A | 8/1991 | Hendrix | |
| 5,439,316 A | 8/1995 | Richardson | |
| 5,725,326 A * | 3/1998 | Van den Noort | 405/104 |
| 6,079,904 A * | 6/2000 | Trisl | 405/107 |
| 6,132,140 A * | 10/2000 | Kullberg | 405/114 |
| 6,200,067 B1 | 3/2001 | Pena | |
| 6,334,736 B1 | 1/2002 | Johnson et al. | |
| 6,672,799 B2 * | 1/2004 | Earl | 405/111 |

* cited by examiner

Primary Examiner—Jong-Suk (James) Lee
Assistant Examiner—Lisa M Saldano
(74) Attorney, Agent, or Firm—John D. Gueliotta

(57) ABSTRACT

A modular flood control panel is provided having a base and supporting "A"-frame structure. The base locks into the ground, or supporting wall of sandbags, with a series of four adjustable angle stakes per each panel. The invention folds flat when not in use, for storage and for transportation on a truck to flood water areas. The panels are joined together with the use of a five inch wide joining slat that slides down into a channel on each side of each panel.

6 Claims, 3 Drawing Sheets

FLOOD CONTROL PANEL SYSTEM

RELATED APPLICATIONS

The present invention was first described in Disclosure Document Registration 509,499 filed on Apr. 8, 2002 under 35 U.S.C. §122 and 37 C.F.R. §1.14. There are no previously filed, nor currently any co-pending applications, anywhere in the world.

BACKGROUND OF THE INVENTION

1. Field of the Invention

The present invention relates generally to flood control systems and, more particularly, to a system of flood control panels that can be interlocked to form a barrier against flood waters.

2. Description of the Related Art

As is well known in the art, a When disaster strikes, every second counts in preventing the loss of life or property. This is especially the case when dealing with floods where water can rise at alarming rates, engulfing entire towns and destroying family belongings that have been collected over many generations. As a result, family heirlooms such as photographs, antiques and other irreplaceable items risk being lost forever, without hope for recovery. This being the case, people are willing to go to great lengths to ensure the safety of their cities, their property, their homes and their belongings during floods caused by hurricanes, tornados and floods. Unfortunately, with the exception of sandbags, which are very labor intensive to fill and deploy, there are no temporary means to effectively thwart flood waters.

A search of the prior art did not disclose any patents that read directly on the claims of the instant invention; however, the following references were considered related.

U.S. Pat. No. 6,200,067 discloses a system and method for construction of temporary watertight barriers.

U.S. Pat. No. 5,040,919 discloses a Containment structure for controlling flood water.

U.S. Pat. No. 4,375,929 discloses a Protective flood barrier consisting of attachable panels.

U.S. Pat. No. 4,692,090 discloses a Multistage hydraulic machine with water chamber.

U.S. Pat. No. 5,439,316 discloses a Reusable flood barrier.

U.S. Pat. No. 972,059 discloses a Temporary wall for protecting against floods.

U.S. Pat. No. 4,498,810 discloses a Collapsible rubber dam to be secured to portions of riverbanks.

U.S. Pat. No. 6,334,736 discloses a Barrier with fluid-fillable body.

Consequently, there is a need for a means by which flood waters from natural disasters can be controlled in a manner that is quick, easy, and effective while doing it in a cost-effective manner.

SUMMARY OF THE INVENTION

It is therefore an object of the present invention to provide an improved flood control systems.

It is a feature of the present invention to provide an improved system of flood control panels that can be interlocked to form a barrier against flood waters.

Briefly described according to one embodiment of the present invention, an apparatus is provided that is designed to contain flood waters. The invention is modular in design and can be joined together to form a retaining structure that could be miles long if needed. The invention resembles the side panels used on an above ground pool with a slightly convex aluminum panel that is placed against the flood waters. The base and supporting "A"-frame structure is provided on the "dry" side. The base locks into the ground, or supporting wall of sandbags, with a series of four adjustable angle stakes per each panel. The invention folds flat when not in use, for storage and for transportation on a truck to flood water areas. It is easily set up with the use of two integral handles built into the bottom of each panel section. These handles, when rotated 90 degrees, lock the upper and lower panels together for easier storage and transport. The panels are joined together with the use of a five inch wide joining slat that slides down into a channel on each side of each panel.

The invention is designed to hold back flood waters that could reach three and one half feet in depth.

The use of the flood shield system safely controls flood waters resulting from natural disasters in a manner that is quick, easy and effective thus protecting personal property and belongings.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the FIGS. 1 through 4.

1. Detailed Description of the Figures

Figure 1:
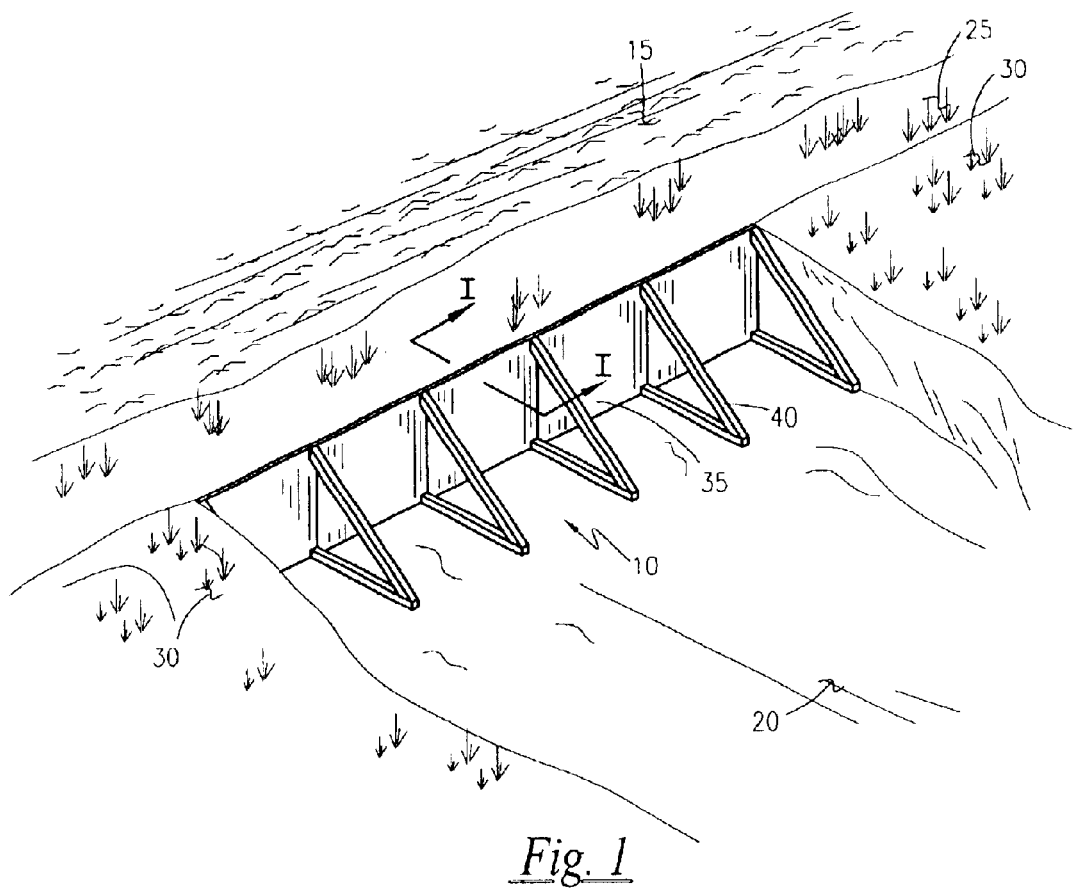
FIG. 1 is a pictorial representation of the flood control panel system shown in an utilized state along a body of water.

Referring first to FIG. 1, a pictorial representation of the flood control panel system 10, shown in an utilized state along a body of water, according to a preferred embodiment of the present invention is depicted. A flood control panel system 10 is shown erected in between a body of approaching flood waters 15 and an area of protected land 20. While the specific topography will vary from application to application, it is envisioned that the approaching flood waters 15 would be a lake, a river, a stream, a creek bed, a flood plain, or the like swollen from excessive rain or snow melt. Additionally, a barrier area 25, such as a beach or waterfront area, is present and is normally expected to be flooded. Areas of high ground 30 may or may not be present, but if present, provide an opportunity to terminate the flood control panel system 10 against said high ground 30. The flood control panel system 10 is comprised of a series of individual panel bodies 35, each supported by an integral supporting frame 40. The panel body 35 and the supporting frame 40 will be described in greater detail herein below.

Figure 2:
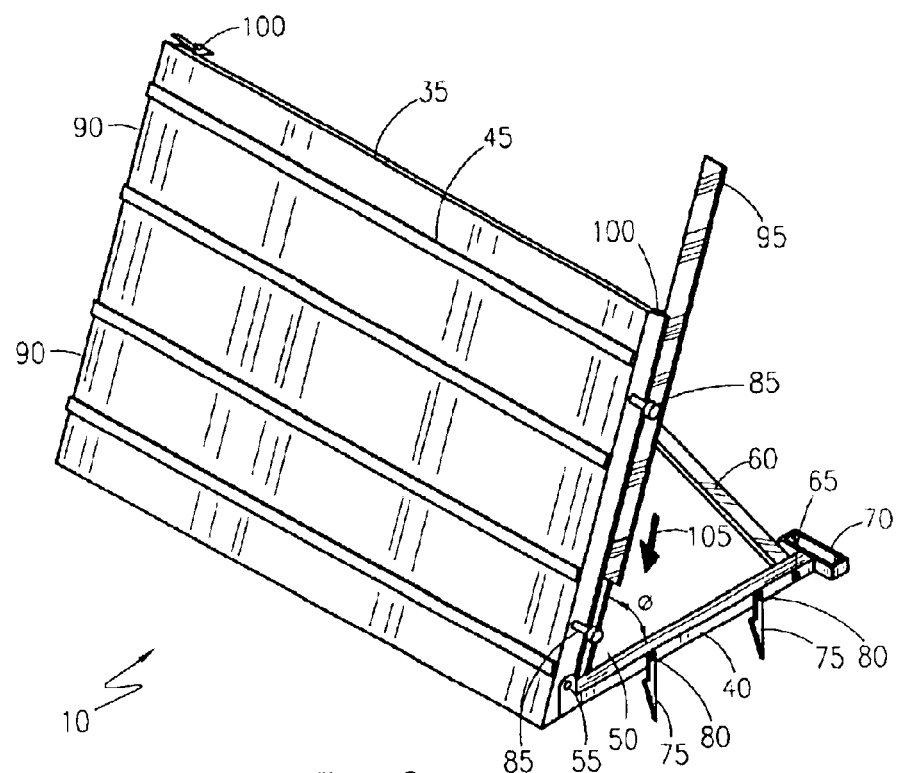
FIG. 2 is a pictorial system of a single flood control panel shown in an opened or deployed state.

Referring next to FIG. 2., a pictorial system of the flood control panel system 10, shown in an opened or deployed state is depicted. Each section of flood control panel system 10 is comprised of the two main components, the panel body 35 and the supporting frame 40. The panel body 35 is manufactured from a solid metal panel, such as aluminum or steel and is provided with a strengthening member 45, such as corrugations, ribs or metal bracing, to withstand the pressure of water. The panel body 35 is four feet wide and approximately five feet high. The panel is positioned at an angle 50, envisioned to be approximately 45–60°. As such, the five-foot height at the supported angle will hold back approaching flood waters up to three and one half feet in depth. The supporting frame 40, in conjunction with the panel body 35 forms an "A"-frame structure with necessary structural rigidity and strength. A first hinge 55 allows the supporting frame 40 to collapse against the panel body 35, when the flood control panel system 10 is not deployed for purposes of storage and transportation. The flood control panel system 10 in its collapsed state will be shown in greater detail herein below. A supporting member 60, positioned between the outer points of the supporting frame 40 and the panel body 35, away from the first hinge 55, locks the supporting frame 40 into place forming a rigid, triangular shape. A second hinge 65 allows the supporting member 60 to engage and disengage the panel body 35. A pair of handles 70, provided at the outward edge of the supporting frame 40 away from the first hinge 55 allows for easy of carrying and positioning the flood control panel system 10. The handles 70 also serve the function of locking the upper and lower panel sections together during transport or storage. A series of four angle-mounted stakes 75 (two of which are only shown here for purposes of clarity) are mounted along the bottom of the supporting frame 40. Each angle-mounted stakes 75 is connected to the supporting frame 40, by the use of set of third hinges 80. The angle-mounted stakes 75 are driven into the dirt, or surrounding grade, thus forming an anchor point for the flood control panel system 10. The use of one's foot, or a hammer, may be required. Each individual panel body 35 is joined to its neighboring panel body 35 (as shown in FIG. 1) by the use of a pair of engagement clips 85, located along one vertical side of the panel body 35. Each engagement clip 85 couples with a mating engagement hole 90 on the adjacent panel. This coupling transforms the individual panel body 35 into one long, rigid structure (as shown in FIG.1). The total length of the flood control panel system 10 is limited only by the number of panel bodies 35 available, and could be up to hundreds of miles long if necessary. The junction formed with the use of the engagement clips 85 and the engagement holes 90 allow some angular deviation to accommodate gentle changes in grade and elevation. While this variation is necessary, it does not provide for a waterproof joint. The waterproof joint is provided by a rubber joining strip 95 which slides down an engagement slot 100, located on each side of each panel body 35. The rubber joining strip 95 is envisioned to be approximately 3 inches wide and 5 feet long, thus allowing it to seal the entire joint between each panel body 35. The rubber nature of the rubber joining strip 95 allows it to stretch and buckle along its entire length, thus accommodating an angular displacement of up to 3 degrees between adjacent panel body 35. The rubber joining strip 95 slides down the engagement slot 100 from the top as shown by a movement direction arrow 105. It is shown partially engaged in this FIG. for purposes of clarity. The opposite edge of the rubber joining strip 95 would engage the engagement slot 100 on the neighboring panel body 35, which also is not shown in this view for purposes of clarity.

Figure 3:
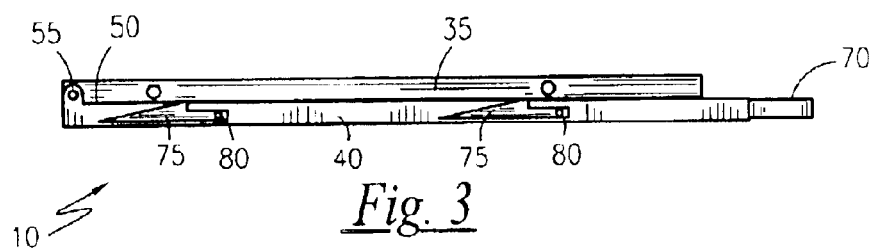
FIG. 3 is a side system of a single flood control panel shown in a closed or collapsed state.

Referring now to FIG. 3, a side system of the flood control panel system 10, shown in a closed or collapsed state is shown. The flood control panel system 10 will be in such a state, when it is in storage, or being transported to or from a possible flood state. In a collapsed state, it occupies a minimum of volume. It can either be stacked or set on edge to allow the maximum number of individual panel bodies 35 to be stored in a given area. The flood control panel system 10 is collapsed by releasing the supporting member 60 (as shown in FIG. 2) and allowing the angle 50 between the panel body 35 and the supporting frame 40 to go to zero, about the first hinge 55. Additionally, the four angle-mounted stakes 75 (only two of which are shown here for purposes of clarity) are allowed to fold up within the supporting frame 40 by the use of the third hinges 80. Finally, the handles 70, which serve to lock the tops and bottom panels together, may also be used to carry, or slide the flood control panel system 10 into or out of its storage position.

Figure 4:
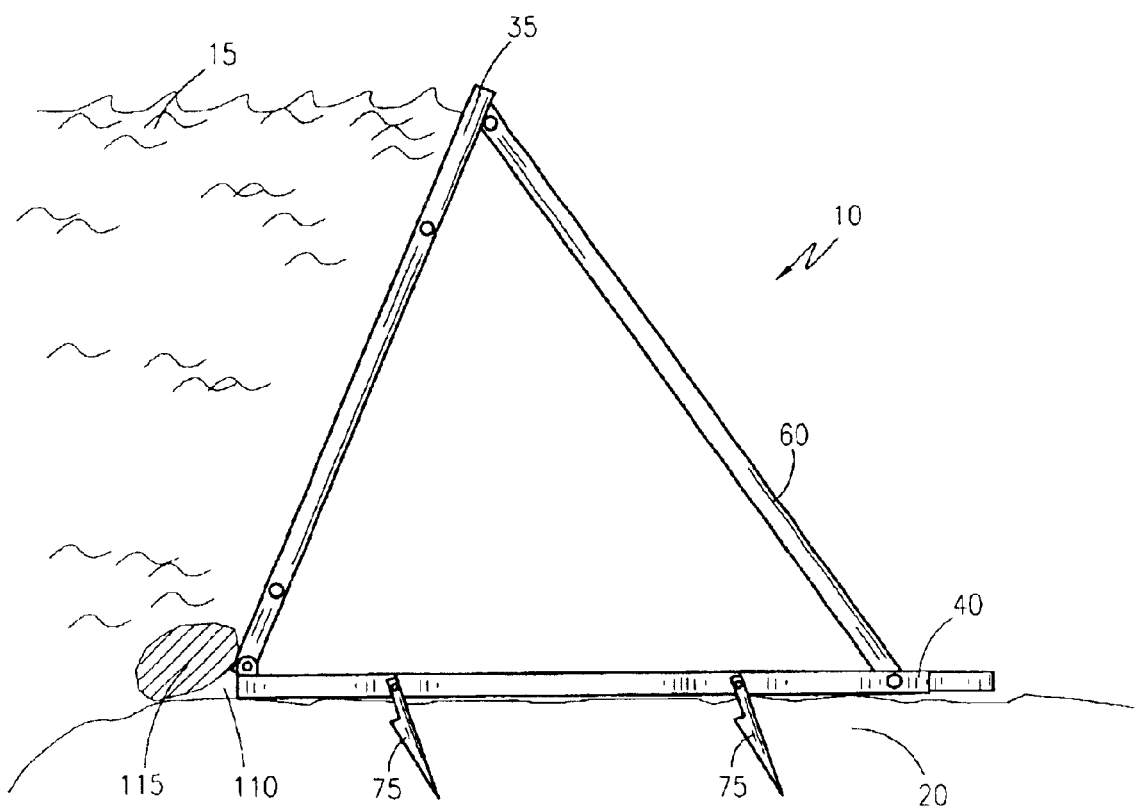
FIG. 4 is a sectional view of the flood control panel as seen along a line I—I, as shown in FIG. 1.

Referring finally to FIG. 4, a sectional view of the flood control panel system 10 as seen along a line I—I, as shown in FIG. 1, is disclosed. The flood control panel system 10 is shown engaging the approaching flood waters 15 up to its design limit of three and one half feet. The angle-mounted stakes 75 firmly engage the protected land 20 to prevent the flood control panel system 10 from "giving way" as in the conventional sense of an embankment breakaway. The panel body 35 is supported by the supporting member 60 against the supporting frame 40. Any and all gaps 110 visible at the juncture between the bottom of the panel body 35 and the protected land 20, must be blocked to maintain the integrity of the flood control panel system 10. A blocking object 115, such as a sandbag or dirt, is placed in a linear arrangement along the entire gaps 110 at the bottom of the flood control panel system 10. In such a manner, approaching flood waters 15 flow through the gaps 110 is denied.

It is envisioned that other styles and configurations of the present invention can be easily incorporated into the teachings of the present invention, and only one particular configuration shall be shown and described for purposes of clarity and disclosure and not by way of limitation of scope.

2. Operation of the Preferred Embodiment

The preferred embodiment of the present invention can be used by the common user in a simple and effortless manner with little or no training. After acquisition of the flood control panel system 10 and transportation to the possible flood water breaching site, the flood control panel system 10 is ready for installation. Based on direction from a knowledgeable person well-versed in repelling flood waters, preferably a civil engineer or similar, the deployment will begin.

A calculation for the number of panel bodies 35 needed for the area to protect must be made. It is performed by dividing the length (in feet) of the potential flood area by four feet (the width of each panel body 35). Next, the panel bodies 35, with their attached supporting frames 40, are laid out along the area to be protected. The panels are then unlocked, separated and unfolded by rotating the handles either left or right, and then lifting the panel body 35 high enough to attach the supporting member 60 between the handles 70. Next, the angle-mounted stakes 75 are driven into the ground, by hammering if necessary, securing the panels in place. A rubber joining strip 95 is then slid into the engagement slot 100 between the panel body 35 making it watertight. The panel bodies 35 are joined mechanically to one another by coupling the engagement clips 85 on the left side of each panel body 35 to the matching engagement holes 90 on the right side of the neighboring panel body 35.

This process is continued until all panel bodies 35 are coupled together, thus forming a solid wall between the approaching flood waters 15 and the area of protected land 20.

If there are uneven areas of land at the bottom of the panel body 35 where water can easily pass under, a single row of blocking object 115, such as sand bags, can be placed in front of the panel body 35. Alternately, low spots could also be filled in with tamped dirt or similar material.

After the threat of flooding has passed, the above process is reversed, and the flood control panel system 10 can be removed, collapsed and stored in a suitable location, until their functionality is needed again.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. A flood control panel system for erection between a body of approaching flood waters and an area of protected land, said flood control panel system comprising:

a series of individual panel bodies that can each be interlocked to form a barrier against flood waters, each said panel body being four feet wide and approximately five feet high and positionable at an angle between 45–60° relative to a supporting frame, wherein each said individual panel body is supported by an integral supporting frame;

an "A"-frame structure having a first hinge along an apex to allow the supporting frame to collapse against the panel body;

a supporting member positioned between the outer points of the supporting frame and the panel body, away from the first hinge, for locking said supporting frame into place forming a rigid, triangular shape; and a series of four angle-mounted stakes mounted along a bottom of said supporting frame, wherein each said angle-mounted stake is connected to the supporting frame by a third hinge;

wherein when said angle-mounted stakes are driven into the dirt, or surrounding grade, an anchor point for the flood control panel system is formed.

2. The flood control panel system of claim 1, wherein each said individual panel body is joined to an adjacent panel body by a pair of engagement clips, each said engagement clip coupled with a mating engagement hole formed on the adjacent panel such that the mated, adjacent panel bodies are mechanically attached into one long, rigid structure.

3. The flood control panel system of claim 2, further comprising:

a waterproof joint provided by a rubber joining strip which slides down an engagement slot formed on each side of each panel body.

4. The flood panel system of claim 1, further comprising a second hinge for allowing said supporting member to engage and disengage the panel body.

5. The flood panel system of claim 1, further comprising a pair of handles at an outward edge of the supporting frame away from said first hinge for allowing carrying and positioning the flood control panel system, said handles rotatably affixed such as to lock said panel body to said supporting frame.

6. The flood panel system of claim 1, wherein each panel body is manufactured from a solid metal panel and is provided with a strengthening member selected from the group comprising corrugations, ribs, and metal bracing.

* * * * *